United States Patent [19]
Merrell et al.

[11] 3,851,254
[45] Nov. 26, 1974

[54] DIGITAL SYSTEM AND METHOD FOR DETERMINING AND DISPLAYING A TELEVISION CHANNEL NUMBER

[75] Inventors: Richard G. Merrell, Darien; Akio Tanaka, Evanston, both of Ill.

[73] Assignee: Zenith Radio Corporation, Chicago, Ill.

[22] Filed: Jan. 26, 1973

[21] Appl. No.: 326,724

[52] U.S. Cl. ..................... 325/455, 334/86, 334/87, 340/168 R
[51] Int. Cl. ............................................ H04b 1/06
[58] Field of Search ........... 325/452, 453, 455, 458, 325/459, 464; 334/15, 30–32, 86, 87; 178/5.6 R, 5.8 R, 7.3 R; 340/168

[56] References Cited

UNITED STATES PATENTS 3,753,119 8/1973 Close ................................. 325/455

*Primary Examiner*—Robert L. Griffin
*Assistant Examiner*—Marc E. Bookbinder
*Attorney, Agent, or Firm*—John H. Coult; John H. Moore; Joseph T. Downey

[57] ABSTRACT

This disclosure depicts apparatus and method for digitally determining and displaying the channel number to which a television receiver is tuned. This involves converting the tuner's local oscillator signal to a scaled local oscillator signal whose frequency is lower than the frequency of the local oscillator signal, counting the number of cycles of the scaled local oscillator signal which occur during a predetermined clock interval, generating in response to said count output pulses related in number to the channel number of the received television signal, and converting said output pulses to a displayed channel number which corresponds to the channel number of the received television signal.

32 Claims, 9 Drawing Figures

| | Channels | Counter 20 Preset (P) | Units Counter Initial Count | Decade Counter Initial Count |
|---|---|---|---|---|
| Band 1 | 2-4 | 3 | 5 | 8 |
| Band 2 | 5-6 | 4 | 4 | 8 |
| Band 3 | 7-13 | 2 | 0 | 7 |
| Band 4 | 14-83 | 3 | 7 | 2 |

| LOW STATES | X | Y | Z |
|---|---|---|---|
| B1 (Ch. 2-4) | 0 | 0 | 0 |
| B2 (Ch. 5-6) | 0 | 0 | 5v |
| B3 (Ch. 7-13) | 0 | 5v | 5v |
| B4 (Ch.14-83) | 5v | X* | X* |

Indicates Any State *

DIGITAL SYSTEM AND METHOD FOR DETERMINING AND DISPLAYING A TELEVISION CHANNEL NUMBER

BACKGROUND OF THE INVENTION

Modern television receivers are equipped with multi-channel tuners whose function it is to discriminate among the various signals present at the antenna. Each tuner may be adjusted to receive a predetermined signal while rejecting all others.

Every television signal is associated with a given center frequency which corresponds to an assigned channel number. In order for the television viewer to know which channel is being received, the tuner or some mechanism associated with it must display the corresponding channel number.

A common method of displaying the channel numbers is to provide the tuner with a wheel or disc around the perimeter of which the available channel numbers are printed. The wheel is normally provided with a center hole through which the tuner shaft extends, terminating in a knob or handle for changing the channel. As the handle is turned to select among the various channels, the wheel rotates. When a particular channel is chosen, the number corresponding to it appears at a predetermined position which indicates the selection of that particular channel.

One developmental approach in modern television receivers is to provide uniform all-channel tuners capable of selecting any one of the 82 channels allocated by the Federal Communication Commission (FCC). If such a tuner were to incorporate the wheel-type channel indicator described above, 82 channel numbers would be crowded around the perimeter of the wheel. This arrangement would allow for only about 4° of rotational movement between channels.

Another method of displaying the channel number is to provide a mechanical link between the rotational shaft on the tuner and a wheel-type device which carries the channel numbers around its perimeter. All channel numbers but one are hidden, an aperture or small window in the receiver cabinet being provided for viewing the channel number which corresponds to the received signal. A disadvantage of such systems which rely on mechanical coupling between the tuner and the channel display device is their relatively high price and their susceptibility to wear. The problem of displaying the proper channel number in an 82 channel ("all-channel") tuning system is even more acute. A multitude of all-channel tuning system approaches have been disclosed to the public. Many of these approaches rely on mechanical coupling between the channel display unit and the tuner for displaying the proper channel number. This means that channel display units and their associated mechanical couplings to the tuner must be tailored to meet the requirements and limitations of the various proposed tuners.

In order to obviate the necessity of tailoring channel display units to the various tuners, a channel display system which is easily adaptable to any tuner is needed. For such a system to be truly suitable for adaptation with any tuner, it should not rely on complex mechanical coupling between itself and the tuner. In addition, if electronic, it should be capable of fabrication in integrated circuit form or at least compatible with the solid state circuitry incorporated in modern television receivers.

It has long been understood in the art that the frequency of a tuner's local oscillator at a given setting is directly related to the frequency of the television signal being received and may therefore be associated with a particular channel and channel number. Up to now, the problem has been one of finding an economical and reliable method for processing this local oscillator information to derive the proper channel number.

Some prior art methods of processing the local oscillator frequency to derive the proper channel number rely on the so-called "birdy counting" method. A conventional implementation of this method includes a crystal-controlled 6 MHz oscillator whose signal is beat with the local oscillator signal, thereby generating harmonics or "birdies". The number of birdies generated as a result of beating these two oscillator signals is dependent on the frequency difference between the 6 MHz oscillator signal and the local oscillator signal and can be used as an indication of the frequency to which the television receiver is tuned. Since most television channels are separated in frequency from their adjacent channels by 6 MHz, tuning the receiver to the next higher channel will result in a predetermined increase in the number of birdies generated. For example, if the Channel 2 local oscillator signal (101 MHz) causes X birdies to be generated, the Channel 3 signal (107 MHz) will cause X + 1 birdies to be generated. This additional birdy can then be used to increase the channel count by one.

A difficulty which is encountered in the birdy counting method and other techniques which rely on the frequency of the local oscillator signal as an indication of the frequency of a received television signal is that all television channels are not separated in frequency from their adjacent channels by 6 MHz. This unequal separation between some television channels is a result of the FCC's division of the television frequency spectrum in four frequency bands; Channels 2–4 occupy a first band, Channels 5 and 6 occupy a second band, Channels 7–13 occupy a third band, and all UHF channels occupy the fourth band. All channels within a given frequency band are separated from their adjacent channels by 6 MHz. But channels which are numerically adjacent yet are in different frequency bands are separated in frequency by more than 6 MHz. These include Channels 4 and 5 which are separated by 10 MHz, Channels 6 and 7 which are separated by 92 MHz and Channels 13 and 14 which are separated by 260 MHz; all other television channels are separated from their adjacent channels by 6 MHz.

It can be seen therefore, that a system which relies on the incremental number of birdies as an indication of the channel of the received television signal must be able to distinguish between the generation of one additional birdy when switching from Channel 2 to 3 and the generation of 15 additional birdies when switching between Channels 6 and 7.

As a result of this unequal frequency separation between certain television channels, attempts to count birdies or other methods which rely on the frequency of the local oscillator for an indication of the channel number of the received television signal have required complicated apparatus to convert the local oscillator frequency to the corresponding channel number of the received television signal This complication, and particularly the requirement that a crystal-controlled oscillator be incorporated into the system, have made this type of channel display system economically unattractive.

OBJECTS OF THE INVENTION

It is a general object of this invention to provide an improved channel indicating system and method for television receivers.

It is another object of this invention to provide a channel indicating system for television receivers which is solid state, requires no mechanical coupling to the associated tuner, and is highly reliable.

It is another object of this invention to provide a channel indicating system which is compatible with all types of commercial color television tuning systems.

It is still another object to provide an improved method for determining and displaying television channel numbers.

It is yet another object of this invention to provide a color television channel indicating system of a type which reads the associated tuner's local oscillator signal to develop an indication of the appropriate channel number, which system is capable of acounting for the large frequency difference among the four frequency bands of television signals in an inexpensive and reliable way.

It is a further object of this invention to provide electronic color television channel indicating apparatus which does not require the incorporation of an additional reference oscillator.

It is another object of this invention to provide a channel indicating system which is adaptable to manufacture in integrated circuit form.

BRIEF DESCRIPTION OF THE DRAWINGS

The features of this invention which are believed to be new are set forth with particularity in the appended claims. The invention together with further objects and advantages thereof may best be understood by reference to the following description in conjunction with the accompanying drawings in which:

DESCRIPTION OF THE PREFERRED EMBODIMENT

It is a stated object of this invention to provide a channel indicating system which requires no mechanical coupling to an associated tuner, which is solid state, and which lends itself to the economies inherent in integrated circuit manufacture. It is preferable that such a system should, if operating by reading the tuner's local oscillator signal, without undue complication, be able to convert the frequency of the local oscillator signal to the channel number of the received television signal while accounting for the unequal frequency separation between the four aforementioned frequency bands.

In accordance with these objectives, one aspect of this invention utilizes the 3.58 MHz color oscillator which is present in all NTSC color television receivers to generate a time base reference or clock signal with which to synchronize a digital channel display system to convert the local oscillator signal to the appropriate channel number.

Figures 1A, 1B, 1C, 1D, 2:
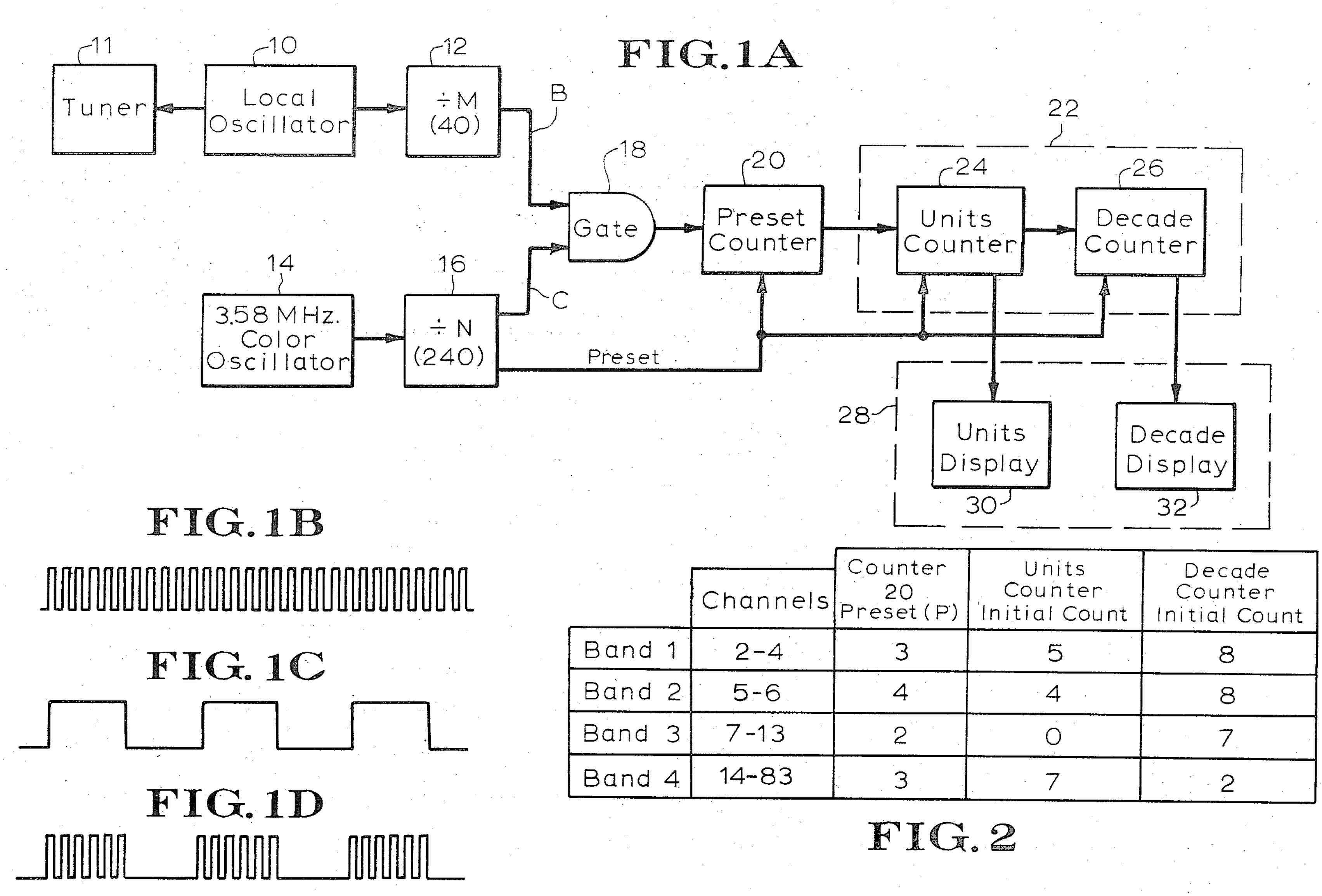
FIG. 1A depicts in block diagram form a portion of a digital channel display system for use in a television receiver which is constructed in accordance with the principles of this invention.
FIGS. 1B–1D depict waveforms generated by the FIG. 1A system.
FIG. 2 is a table which lists operating conditions for certain elements of the FIG. 1A system.

SUch a channel display system, constructed in accordance with the principles of this invention, is shown in a simplified block diagram form in FIG. 1A.

Local oscillator 10, of conventional construction, generates a CW (continuous wave) signal which is heterodyned in tuner 11 against a received television signal to generate an intermediate frequency signal in a manner well known in the art (this function of local oscillator 10 is not shown). An output of local oscillator 10 is coupled to dividing means 12 wherein the frequency of the local oscillator signal is divided by a fixed integer M, shown here by way of example as 40, for converting the local oscillator signal to a signal whose frequency is lower than the local oscillator signal by the factor M. It is the frequency of this scaled down local oscillator signal which will be converted to a corresponding channel number.

Color oscillator 14, also of conventional construction, is the same oscillator which, in color television receivers, generates the CW reference signal for demodulating the chroma information carried by the 3.58 MHz subcarrier (this function is not shown). An output of color oscillator 14 is coupled to a dividing means 16 which divides the color oscillator signal by an integer N, shown here as 240, to produce a clock signal lower in frequency than the color oscillator signal by dividing factor N. The period of the clock signal generated by dividing means 16 is used to establish a time base reference (referred to herein as the clock interval) for the channel display system. FIGS. 1B and 1C illustrate typical waveforms of the signals produced by dividing means 12 and 16, respectively, at points B and C in FIG. 1A.

Referring again to FIG. 1A, gating means 18 receives the outputs of both dividing means 12 and 16 and passes the scaled down local oscillator signal from its input to its output terminal when periodically activated by a predetermined value of the clock signal generated by dividing means 16. Gating means 18 preferably consists of a conventional AND gate which generates a high output when each input signal is also high. This effect is shown in FIG. 1D which illustrates the form of the signal appearing at the output of gating means 18. Note that the output of gating means 18 is a series of periodically repeating pulse trains or pulse groups, each of which contains a number of cycles of the scaled down local oscillator signal. In the description of this invention which follows, it will be shown how the number of cycles of the scaled down local oscillator signal which occur during each pulse group can be related to the channel number of the received television signal.

In order to count the number of scaled local oscillator cycles which occur during each clock interval, a preset counter 20 is coupled to the output terminal of gating means 18. For reasons which will be made apparent, this counter is preset to begin counting from a certain integer P so as to produce an output pulse whenever its count exceeds another integer (Q—1), thereby generating an output pulse on the (Q—P)th cycle of the scaled down local oscillator signal and on every Qth cycle thereafter during any clock interval. That is, counter 20 begins counting from the integer P, counts up to Q—1, and resumes counting from zero toward Q—1 again; one output pulse is generated each time the count returns to zero. For example, if during a given clock interval 84 cycles of the scaled down local oscillator signal are present in an individual pulse group, and counter 20 is preset to begin counting from 3 ($P=3$) and conditioned to generate an output pulse whenever the count exceeds 4 ($Q=5$), an output pulse will be generated on the second cycle of the pulse group and on every fifth cycle thereafter, thereby generating a total of 17 output pulses and leaving a remainder of 2 in the counter. Prior to the arrival of the next group of cycles in the pulse train, preset counter 20 is preset to a count of 3 by the clock pulse generated by dividing means 16. This insures that the count will always begin from the same predetermined number regardless of the remainder within counter 20.

In order to facilitate the further explanation of the invention, the considerations which dictate the numerical choices for the integers M, N, P and Q, and the reasons for presetting counter 20 in the manner described will be deferred until the entire system as depicted in FIG. 1A has been described.

The output pulses generated by preset counter 20 are coupled to a counting means 22 which includes a units counter 24 driving a decade counter 26. Both counters 24, 26 may be conventional digital counters which count the number of input pulses they receive and generate an output pulse upon reaching a predetermined count. For example, units counter 24 counts up to 9, then to 0, 1, 2, . . . , etc. Each time the counter advances from a 9 count to a 0 count, it generates one output pulse. Thus, decade counter 26 receives an input pulse on every 10th count of units counter 24.

In order to insure that counters 24, 26 reach a final count which is indicative of the channel number of the received television signal, each is preset to initial counts which, when added to the number of output pulses from preset counter 20 during any clock interval, cause the counters 24, 26 to reach final counts represented by binary coded decimal states which correspond to the channel number of the received television signal.

To clarify the operation of the counting means 22, consider the example above where, upon reception of a Channel 2 signal, preset counter 20 generated 17 output pulses during each clock interval. With unit counter 24 preset to an initial count of 5 and decade counter 26 preset to an initial count of 8, the counting of the output pulses of preset counter 20 proceeds as follows. Unit counter 24, having been preset to an initial count of 5, counts the first 5 pulses arriving from preset counter 20 and thereupon generates a first output pulse because its count has advanced from 5 through 9 and then to 0. Having counted the first 5 to 17 pulses, unit counter 24 continues counting and generates a second output pulse upon counting the 15th input pulse. Counting the 2 remaining pulses causes unit counter 24 to rest in a final state which corresponds to a count of 2.

Since decade counter 26 was preset to an initial count of 8, the 2 pulses which it receives from unit counter 24 will cause it to advance to 9 and then to 0. The zero in the decade counter and the 2 in the unit counter show that the system has properly determined that the frequency of the local oscillator corresponds to Channel 2.

Display means 28 includes a units display 30 and a decade display 32 for displaying the channel number associated with the received television signal in response to the binary coded decimal states of counting means 22.

The considerations which dictate the numerical choices for the integers M, N, P and Q and the reasons for presetting counter 20 in the manner previously described will now be examined. Recalling that most channels are separated in frequency by 6 MHz, the first requirement that the numerical values for these integers must meet is that every 6 MHz increment in the frequency of a received television signal and the resulting 6 MHz increment in frequency of the local oscillator signal must be converted to one additional output pulse from counter 20. The additional output pulse which is generated can then be used to increase a channel number display by a count of one.

Referring again to FIG. 1A, note that the number of cycles per second of the scaled local oscillator signal which are received by gate 18 is equal to $f_1 \div M$, where $f_1$ is the frequency of the local oscillator signal. Assuming that gate 18 is activated for a clock interval of duration K, the number of scaled local oscillator cycles received by gate 18 per clock interval equals $(f_1 \div M) \cdot K$, where $f_1$ is the frequency of the local oscillator in MHz and K is the duration of a clock interval in microseconds. The relationship between K, N and $f_c$ is given by the expression $K = N \div (2f_c)$, where $f_c$ is the frequency of the color oscillator signal in MHz.

Since counter 20 effectively generates 1 output pulse for every Qth input pulse, the total number of output pulses generated by counter 20 during each clock interval can be expressed by the following relationship:

$$(f_1/M) \cdot K/(Q) = X \qquad 1.$$

where X is the number of pulses per clock interval generated by counter 20 and the integer P was temporarily set equal to zero. Assuming a nonzero value for the integer P, equation (1) must be rewritten as:

$$1+\frac{\left(\frac{f_1}{M}\cdot K\right)-(Q-P)}{Q}=X \qquad (2)$$

In order to guarantee that the number of pulses generated by counter 20 increases by one whenever the frequency of the local oscillator signal increases by 6 MHz, another constraint may be imposed on the selection of the integers in question as dictated by the expression:

$$1+\frac{\left(\frac{f_1+6}{M}\cdot K\right)-(Q-P)}{Q}=X+1 \qquad (3)$$

Solving equations (2) and (3) simultaneously gives the following result:

$$M \cdot Q = 6K \quad 4.$$

Equation (4) states that the product of the integers M and Q must be equal to 6 times the clock interval in order to quarantee the generation of one additional output pulse for every 6 MHz increase in frequency of the local oscillator signal.

The design of the channel display system may proceed by choosing an integer N which provides a convenient clock interval for the channel display system. The choice of a relatively large value integer for N will allow the counting circuitry to operate at a relatively low frequency and permit the use of conventional digital components.

Assuming N is chosen to be 240 as shown in the Fig. 1A system, K, the clock interval, is equal to:

$240 \div [2 \cdot (3.58 \text{ MHz})] = 33.5$ microseconds.

According to expression (4), M·Q should equal 201, but in practice, one can choose integers whose product is very nearly equal to 201. In this case, M and Q were chosen to be 40 and 5, respectively. Since their product does not equal 201, counter 20 will be left with a remainder after counting the number of cycles per clock interval, but that remainder will never be great enough to cause the generation of additional output pulses over the range of presently assigned channels.

In order to complete the analysis of the considerations which dictate the numerical choices for the integers M and Q, and to point out the reasons for presetting counter 20 to an integer P as first described, the consequences of using two oscillators, 10 and 14, which are not phase locked must be examined.

In a conventional television receiver, the local oscillator 10 and the color oscillator 14 do not ordinarily exhibit a fixed phase relationship. Because of this lack of a fixed phase relationship between the oscillator signals, it must be assumed that the phase of one signal may be varying with respect to the other. An effect of this varying phase relationship is that the waveform shown in FIG. 1C may appear to be moving horizontally with respect to the waveform shown in FIG. 1B. When this movement occurs, the number of cycles which appear in any one group of cycles within the pulse train of FIG. 1D may vary by up to plus or minus one cycle, depending upon where the leading edges of the FIG. 1C waveform occur and on the frequency of the local oscillator 10. In order to insure that an erroneous count is not produced by counter 20 in response to possible variations in the number of cycles in each pulse group, thereby generating an unpredictable number of output pulses for any given local oscillator frequency, the following additional constraints are placed upon the selection of these integers. The integer P which is the preset number at which counter 20 begins to count, and the integer (Q−1) at which counter 20 produces an output pulse whenever its count has been exceeded are selected so as to insure that any errors in the number of the cycles appearing in any group at the output terminal of gating means 18, attributable to the lack of a known phase relationship between the local oscillator signal and the color oscillator signal, will not be large enough to influence the number of output pulses generated by preset counter 20. The following example illustrates how a careful choice of the integers P and Q can cause counter 20 to absorb an error of plus or minus one cycle in its count.

Assume that the television receiver is tuned to Channel 2. Local oscillator 10 will then be oscillating at a frequency of 101 MHz. If the integer M associated with dividing means 12 is chosen to be 40 and the integer N associated with dividing means 16 is chosen to be 240, gating means 18 will generate groups of pulses which each contain 85 cycles. With counter 20 preset to begin counting from the integer 3 ($P=3$) and conditioned to generate one output pulse each time its accumulated count exceeds the integer 4 ($Q=5$), the counting sequence proceeds as follows. Upon counting the first 2 cycles of a group containing 85 cycles, counter 20 reaches a count of 4, resumes its count from zero, and generates a first output pulse. Upon reception of the next cycle in that group, the count begins anew from one and continues again until the count again exceeds 4, whereupon a second output pulse is generated. This counting procedure continues as described until 17 output pulses have been generated. When the 17th output pulse is generated (corresponding to the 82nd cycle of that group), the count renews again from one and terminates its count at 3 on the 85th cycle of that group. The significance of the remainder of 3 is that should there be an error of plus one on the number of cycles in that particular group, the remainder would be 4 rather than 3. Since this remainder does not exceed 4, counting one additional cycle does not cause the generation of an additional output pulse. If, however, the error in the number of cycles had been minus one, the remainder would have been 2 rather than 3, and would not have caused preset counter 20 to generate less than 17 output pulses.

Consider the effect on the system if counter 20 had been preset to begin counting from the integer 0; the 85 cycles present in any group of cycles would have caused preset counter 20 to generate 17 output pulses with a remainder of 0. With an error in the number of cycles of minus one, only 16 output pulses would have been generated leaving a remainder of 4, thus allowing a small error in the number of cycles within each pulse group to effect an erroneous output from counter 20. This illustrates the necessity of carefully selecting the aforementioned integers.

The description of the channel display system has been until now restricted to an explanation of its operation during reception of television signals separated in frequency by 6 MHz. As indicated hereinbefore, the television spectrum may be thought of as being divided into four frequency bands each of which is separated from its adjacent bands by more than 6 MHz. The discussion to follow will indicate how this channel display system accounts for the large frequency gaps between adjacent frequency bands and correctly interprets the local oscillator frequency to indicate the proper channel number.

Recalling that the integers associated with dividing means 12 and 16 and counter 20 were chosen to insure that counter 20 would generate one additional output pulse for each 6 MHz increment in the frequency of the received television signal, it then follows that those same integers will not suffice to generate one additional output pulse when switching between Channels 4 and 5, 6 and 7, or 13 and 14, all of which are separated by a frequency difference in excess of 6 MHz. However, because of the way in which the frequency of the local oscillator signal is converted to a corresponding channel number, the only integer which need be changed when switching between frequency bands is the integer P associated with counter 20. By presetting counter 20 to a different integer P for each frequency band and presetting unit counter 24 and decade counter 26 to different predetermined initial counts for each frequency band, the channel display system will always convert the local oscillator signal to the proper channel number. A table showing the proper presets for each frequency band is shown in FIG. 2; those presets are applicable to the case where dividing means 12 divides by 40, dividing means 16 divides by 240, and counter 20 is preset to generate an output pulse when its count exceeds 4.

At this point, it should be emphasized that presetting counter 20 and counting means 22 prior to each counting cycle or clock interval is not the only means of establishing a correspondence between the number of scaled local oscillator cycles per clock interval and the appropriate channel number. A similar result might also be obtained by resetting the counters 20, 22 during each clock interval rather than presetting them prior to each clock interval. For example, if preset counter 20 generates 17 output pulses per clock interval when Channel 2 is being received, units counter 24 can reach a final count of 2 by being reset to zero after having counted the first 15 output pulses. Note, however, that this reset must occur during the count rather than prior to the count. The disadvantage of resetting, as compared with presetting, is that in detecting the point at which the reset should occur and then resetting each counter, there is a certain amount of inherent delay which makes it possible for pulses to pass uncounted while the system is being reset. The use of a preset quarantees that every pulse will be counted, and in addition, permits the use of simpler logic circuitry.

Figures 3, 4B, 4C:
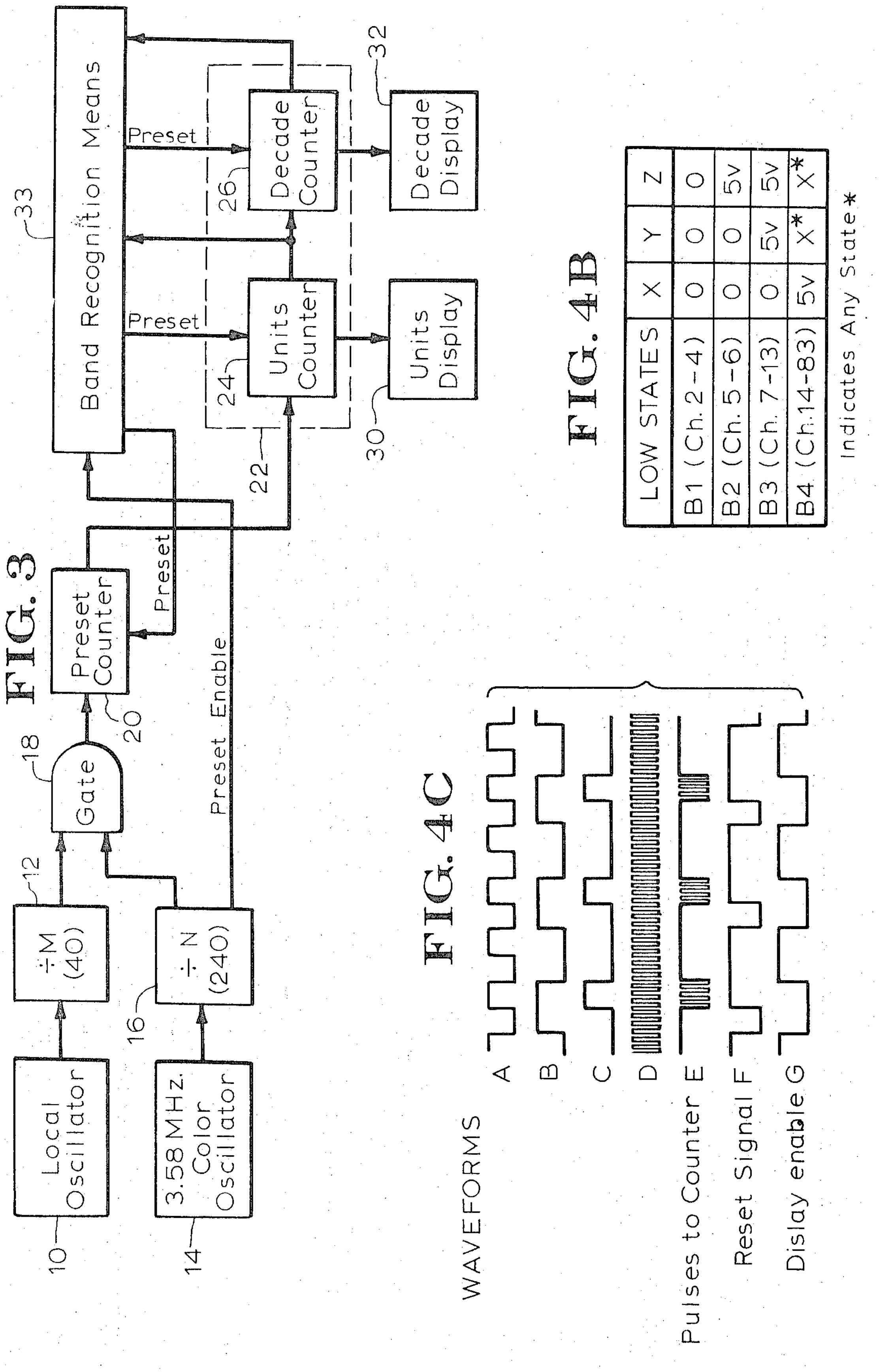
FIG. 3 depicts in block diagram form a more complete channel display system constructed in accordance with the principles of this invention.
FIG. 4B is a table which lists operational states of certain elements in the FIG. 4A system.
FIG. 4C depicts waveforms generated at designated points in the system of FIG. 4A.

In order to preset counter 20, unit counter 24 and decade counter 26 to states which correspond to the frequency band in which the received television signal lies, a band recognition means is included. FIG. 3 illustrates a channel display system having a band recognition means 33 which senses the states of counting means 22 to determine in which of the four frequency bands a received television signal lies. Upon determining that a change is required in the preset states, band recognition means 33 presets counter 20, units counter 24 and decade counter 26 to the appropriate preset states. Band recognition means 33 receives inputs from the unit and decade counters 24, 26 to sense whether those counters have counted more than a predetermined minimum number and less than a predetermined maximum number. If the count lies within the predetermined range, no changes in the preset states are made. If band recognition means 33 senses a count which is beyond the predetermined range, it presets counter 20, units counter 24, and decade counter 26 to states which correspond to the next higher frequency band. The states of counters 24, 26 are again sensed to determine whether their counts lie within a new predetermined range; if not, band recognition means 33 advances to the next frequency band in the manner described above until it determines that all preset states do correspond to the frequency band in which the received television signal lies. In addition, band recognition means 33 receives from dividing means 16 a preset enable signal which provides the correct timing information for the generation of the preset signals; this insures that each preset signal is generated just prior to the next clock interval. The embodiment of band recognition means 33 may be of conventional digital construction in accordance with its function as described above.

An alternate embodiment of a band recognition means useful in television receivers having varactor tuners compares the varactor's tuning voltage to fixed predetermined reference voltages. Since the varactor tuning voltage uniquely determines which channel a television receiver is tuned to, comparing its value to predetermined reference voltages will reveal the appropriate frequency band. After determining the frequency band of the received television signal, counter 20, units counter 24, and decade counter 26 are preset to their appropriate states.

Figure 4A:
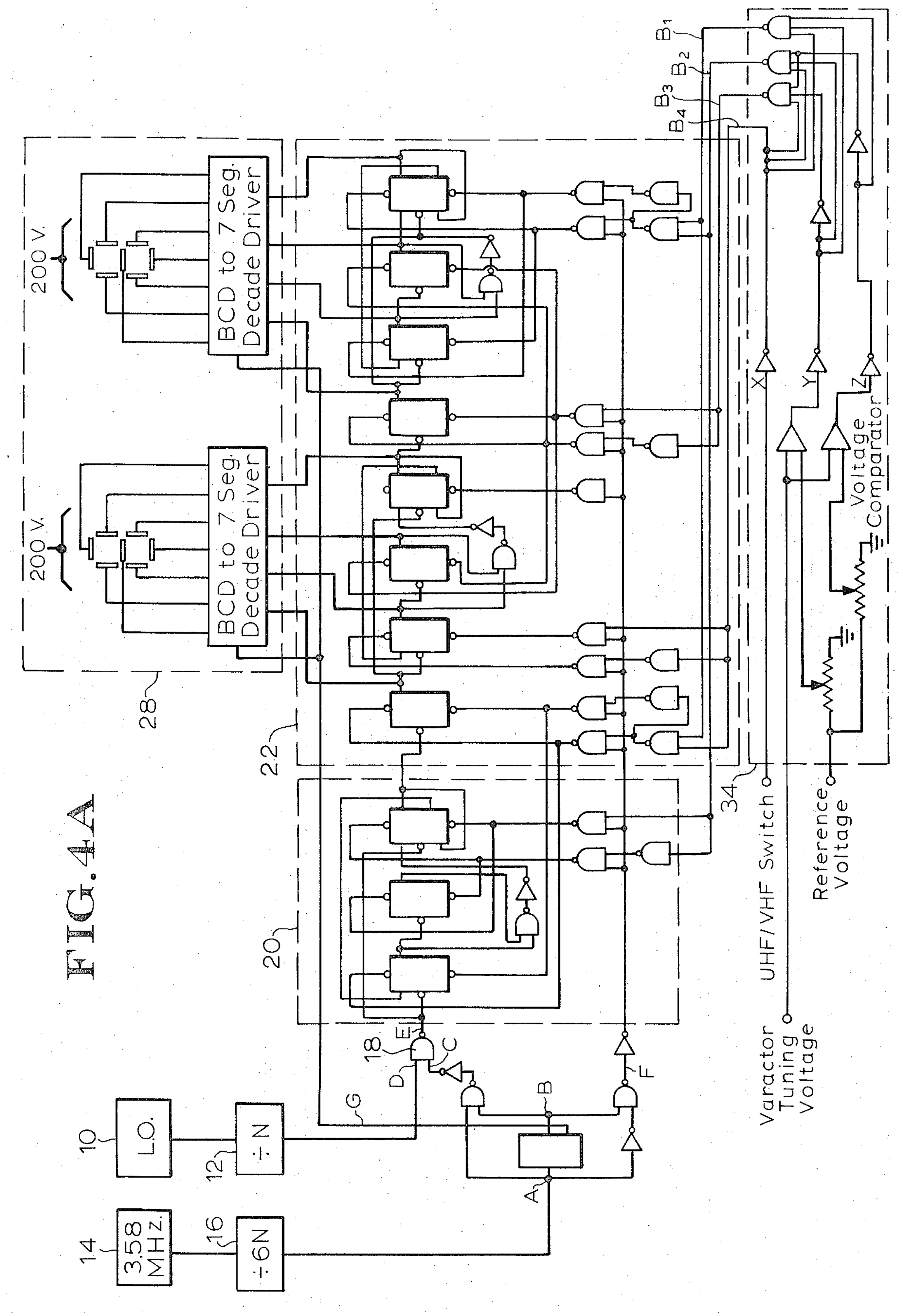
FIG. 4A is a schematic representation of a preferred embodiment of a channel display system constructed in accordance with the principles of the FIG. 1A system.

A preferred digital implementation of the channel display system is shown in schematic form in FIG. 4A. As shown, display means 28 includes BCD (binary coded decimal) decoders and drivers for driving 7 segment channel indicating devices. Band sensing means 34 includes means for comparing a varactor tuning voltage to fixed reference voltages and means for sensing the state of a UHF/VHF switch. The output of band sensing means 34 consists of a set of four presetting terminals, B1–B4. The table shown in FIG. 4B indicates the states of these terminals for all possible combinations of input variables. The remainder of the FIG. 4A system is a digital implementation of the FIG. 1A channel display system. The numbered elements of FIG. 4A correspond to those elements of FIG. 1A which are identified by like numbers.

Waveforms which are associated with certain indicated points of the FIG. 4A system are shown in FIG. 4C to indicate the timing and synchronization which is established by oscillator 14.

All flip flops contained within counters 20 and 22 are clocked J–K. The J and K inputs which are not designated are enabled; the R and S inputs which are not designated are disabled.

Thus, it is apparent that there has been provided in accordance with the invention a channel display system that fully satisfies the objects as set forth above. While the invention has been described in conjunction with specific embodiments thereof, it is evident that many alterations, modifications and variations will be apparent to those skilled in the art in light of the foregoing invention. For example, the reference oscillator used to generate the time base reference need not be the 3.58 MHz color oscillator used in the description above. Any suitable oscillator may be used as long as the criteria stated hereinbefore in connection with the choice of integers and preset states is complied with. Accordingly, it is intended to embrace all such alterations, modifications, and variations which fall within the spirit and scope of the appended claims.

I claim:

1. For use in an all-electronic-continuous tuning television receiver having a tuner and a local oscillator and adapted to receive television signals which may lie in any of four separated frequency bands, each band including television channels separated in frequency from their adjacent channels by 6 MHz, a channel number display system producing the channel number of any signal in any of said bands based upon the frequency of said local oscillator comprising:

clock means for establishing a periodic clock interval which provides a time base reference for the channel display system;

dividing means coupled to the local oscillator for converting the local oscillator signal to a scaled local oscillator signal whose frequency is lower than the frequency of the local oscillator signal by a factor M;

first counting means receiving said scaled local oscillator signal, conditioned to generate one additional output pulse for each 6 MHz increment in the frequency of the received television signal and responsive to said clock means for counting the number of cycles of said scaled local oscillator signal which occur during each clock interval and for generating output pulses related in number to the channel number of the received television signal; and display means receiving said output pulses and responsive to said clock means for converting the number of output pulses received per clock interval to a displayed channel number which corresponds to the channel number of the received television signal.

2. For use in a television receiver having a tuner and a local oscillator and adapted to receive television signals which may lie in any of four separated frequency bands, each band including television channels separated in frequency from their adjacent channels by 6 MHz, a channel number display system comprising:

clock means for establishing a periodic clock interval which provides a time base reference for the channel display system;

dividing means coupled to the local oscillator for converting the local oscillator signal to a scaled local oscillator signal whose frequency is lower than the frequency of the local oscillator signal by a factor M;

first counting means receiving said scaled local oscillator signal and responsive to said clock means for counting the number of cycles of said scaled local oscillator signal which occur during each clock interval, said first counting means being preset to begin counting from a preset integer P so as to produce an output pulse when the count exceeds another integer (Q—1), said first counting means generating an output pulse on the (Q—P)th cycle of said scaled local oscillator signal and on every Qth cycle thereafter during a clock interval, the factors M, P and Q being chosen to cause said first counting means to produce output pulses related in number to the channel number of the received television signal; and display means receiving said output pulses and responsive to said clock means for converting the number of output pulses received per clock interval to a displayed channel number which corresponds to the channel number of the received television signal.

3. For use in a television receiver having a tuner and a local oscillator and adapted to receive television signals which may lie in any of four separated frequency bands, each band including television channels separated in frequency from their adjacent channels by 6 MHz, a channel number display system comprising:

clock means for establishing a periodic clock interval which provides a time base reference for the channel display system;

dividing means coupled to the local oscillator for converting the local oscillator signal to a scaled local oscillator signal whose frequency is lower than the frequency of the local oscillator signal by a factor M:

first counting means receiving said scaled local oscillator signal and responsive to said clock means for counting the number of cycles of said scaled local oscillator signal which occur during each clock interval, said first counting means being preset to begin counting from a preset integer P so as to produce an output pulse when the count exceeds another integer (Q—1), said first counting means generating an output pulse on the (Q—P)th cycle of said scaled local oscillator signal and on every Qth cycle thereafter during a clock interval, the factors M, P and Q being chosen to cause said first counting means to produce output pulses related in number to the channel number of the received television signal;

second counting means receiving the output pulses from said first counting means and responsive to said clock means for establishing binary coded decimal states which are related to the number of said output pulses received per clock interval and which correspond to the channel number of the received television signal;

band recognition means for determining in which of the four frequency bands a received television signal lies and for resetting said first counting means to a different predetermined value of said preset integer P whenever the frequency band of the received television signal changes, the numerical value of the integer P being dependent upon the band within which the received television signal lies; and display means coupled to said second counting means for displaying the channel number associated with the received television signal in response to the binary coded decimal states of said second counting means.

4. The system as defined in claim 3, wherein said second counting means includes a units counter and a decade counter both coupled to said band recognition means and each being preset by said band recognition means to initial counts which, when added to the number of output pulses from said first counting means during any clock interval, cause said units and decade counters to reach final counts, represented by binary coded decimal states, which correspond to the channel number of the received television signal, said initial counts being reset to different predetermined initial counts by said band recognition means upon reception of a television signal which lies within a different frequency band.

5. The system as defined in claim 3, wherein said television receiver is a color receiver and wherein said clock means includes a 3.58 MHz local color oscillator of the television receiver.

6. For use in a television receiver having a tuner and a local oscillator and adapted to receive television signals which may lie in any of four separated frequency bands, each band including television channels separated in frequency from their adjacent channels by 6 MHz, a channel number display system comprising:

clock means for establishing a periodic clock interval which provides a time base reference for the channel display system;

dividing means coupled to the local oscillator for converting the local oscillator signal to a scaled local oscillator signal whose frequency is lower than the frequency of the local oscillator by a factor M;

first counting means receiving said scaled local oscillator signal and responsive to said clock means for counting the number of cycles of said scaled local oscillator signal which occur during each clock interval, said first counting means being preset to begin counting from a preset integer P so as to produce an output pulse when the count exceeds another integer (Q–1), said first counting means generating an output pulse on the (Q–P)th cycle of said scaled local oscillator signal and on every Qth cycle thereafter during a clock interval, the factors M, P and Q being chosen to cause said first counting means to produce output pulses related in number to the channel number of the received television signal;

second counting means including a units counter and a decade counter coupled to said first counting means and said clock means, said units and decade counter being preset to initial counts which, when added to the number of output pulses from said first counting means during each clock interval, cause said counters to reach final counts in the form of binary coded decimal states which correspond to the channel number of the received television signal;

band recognition means for determining in which of the four frequency bands a received television signal lies and for resetting said first counting means to a new predetermined integer P and said unit and decade counters to new initial counts whenever the frequency band of the received television signal changes, the numerical value of the integer P and the initial counts of said counters being dependent upon the band within which the frequency of the received television signal lies; and display means coupled to said second counting means for displaying the channel number associated with the received television signal in response to the binary coded decimal states of said second counting means.

7. The system as defined in claim 6, wherein said television receiver is a color receiver and wherein said clock means includes a 3.58 MHz local color oscillator of the television receiver.

8. The system as defined in claim 6 in which said band recognition means is coupled to and senses the states of said second counting means to determine in which of the four frequency bands a received television signal lies.

9. The system as defined in claim 6 wherein said television receiver's tuner includes a varactor for determining the frequency of the local oscillator and wherein said band recognition means compares the varactor's tuning voltage to predetermined reference voltages developed in said band recognition means in order to determine in which frequency band a received television signal lies.

10. For use in a color television receiver having a 3.58 MHz color oscillator, a tuner and a local oscillator, and adapted to receive television signals which may lie in any of four separated frequency bands, each band including television channels separated in frequency from their adjacent channels by 6 MHz, a channel number display system comprising:

dividing means receiving the tuner's local oscillator signal for dividing said local oscillator signal by an integer M to produce a scaled local oscillator signal lower in frequency than the tuner's local oscillator signal by the factor M;

means coupled to the color oscillator for dividing the color oscillator signal by an integer N to produce a clock signal lower in frequency than the color oscillator signal by the factor N, the period of said clock signal being used as a time base reference for the channel display system;

gating means receiving the scaled local oscillator signal and the clock signal for passing said scaled local oscillator signal from an input terminal to an output terminal of said gating means when periodically activated by a predetermined value of said clock signal;

a first counting means coupled to the output terminal of said gating means and responsive to said clock means for counting the number of scaled local oscillator cycles which occur during each clock period, said first counting means being preset to begging counting from a preset integer P so as to produce an output pulse when the count exceeds another integer (Q–1), said first counting means generating an output pulse on the (Q–P)th cycle of the scaled local oscillator signal and on every Qth cycle thereafter during any clock period, the integers N, M, P and Q being selected so as to insure that any errors in the number of cycles of the scaled local oscillator signal appearing at the output terminal of said gating means, attributable to the lack of a known phase relationship between said local oscillator signal and said color oscillator signal, will not be large enough to influence the number of output pulses generated by said counting means, the integeres M and Q being further restricted to those integers which cause said first counting means to produce one additional output pulse for each 6 MHz increment in frequency of the received television signal;

a second counting means receiving the output pulses from said first counting means and responsive to said clock means for establishing binary coded decimal states which are. related to the number of said output pulses received per clock interval and which correspond to the channel number of the received television signal;

band recognition means for determining in which of the four frequency bands a received television signal lies and for resetting said first counting means to a new predetermined value of said preset integer P whenever the frequency band of the received television signal changes, the numerical value of the integer P being dependent upon the band within which the received television signal lies; and a display means coupled to said second counting means and responsive to the binary coded decimal states of said second counting means for displaying the channel number associated with the received television signal.

11. The system as defined in claim 10, wherein said second counting means includes a units counter and a decade counter, both coupled to said band recognition means and each being preset by said band recognition means to initial counts which, when added to the number of output pulses from sadi which, when added to the number of output pulses from said first counting means during any clock interval, causes said counters to reach final counts represented by binary coded decimal states which correspond to the channel number of the received television signal, said initial counts being reset to different predetermined initial counts by said band recognition means upon reception of a television signal which lies within a different frequency band.

12. The system as defined in claim 10, wherein the integers M and Q are selected in accordance with the expression $M{\cdot}Q{=}6K$ where K is the duration of the clock interval in microseconds.

13. The system as defined in claim 10, in which said band recognition means is coupled to and senses the states of said second counting means to determine in which of the four frequency bands a received television signal lies.

14. The system as defined in claim 10, wherein said television receiver's tuner includes a varactor for determining the frequency of the local oscillator and wherein said band recognition means compares the varactor's tuning voltage to predetermined reference voltages developed in said band recognition means in order to determine in which frequency band a received television signal lies.

15. The system as defined in claim 11, wherein the integer M is chosen to be 40, the integer N is chosen to be 240 and the integer Q is chosen to be 5, the values of these integers remaining fixed for each of the four frequency bands; during reception of channels 2–4, said band recognition means sets the integer P at 3, the initial count of said units counter at 5, and the initial count of said decade counter at 8; during reception of channels 5–6, the band recognition means sets the interger P at 4, the initial count of said units counter at 4, and the initial count of said decade counter at 8; during reception of channels 7–13, the band recognition means sets the integer P at 2, the initial count of said units counter at zero, and the initial count of said decade counter at 7; during reception of all UHF channels, the band recognition means sets the integer P at 3, the initial count of said units counter at 7, and the initial count of said decade counter at 2.

16. A method of determining and displaying the channel number of a received television signal in an all-electronic-continuous tuning television receiver having a tuner and a local oscillator, with each television signal lying in one of four frequency bands and each band including only those television signals which are separated in frequency from their adjacent channels by 6 MHz, said method determining the channel number of said signal in any of said bands based upon the frequency of said local oscillator comprising:

converting the local oscillator signal to a scaled local oscillator signal whose frequency is lower than the frequency of the local oscillator signal by the factor M;

establishing a periodic clock interval to provide a time base reference;

counting the number of cycles of said scaled local oscillator signal which occur during each clock interval and generating in response to said count output pulses related in number to the channel number of the received television signal with one additional output pulse for each 6 MHz increment in the frequency of the received television signal; and converting said output pulses to a displayed channel number which corresponds to the channel number of the received television signal.

17. A method of determining and displaying the channel number of a received television signal in a television receiver having a tuner and a local oscillator, with each television signal lying in one of four frequency bands and each band including only those television signals which are separated in frequency from their adjacent channels by 6 MHz, said method comprising:

converting the local oscillator signal to a scaled local oscillator signal whose frequency is lower than the frequency of the local oscillator signal by the factor M;

establishing a periodic clock interval to provide a time base reference;

counting the number of cycles of said scaled local oscillator signal which occur during each clock interval by initiating the count from an integer P and generating an output pulse when the count exceeds another integer (Q—1), thereby generating an output pulse on the (Q—P)th cycle of said scaled local oscillator signal and on every Qth cycle thereafter during any clock interval, the factors M, P and Q being chosen so as to insure the generation of output pulses whose number is related to the channel number of the received television signal; anf converting said output pulses to a displayed channel number which corresponds to the channel number of the received television signal.

18. A method of determining and displaying the channel number of a received television signal in a television receiver having a tuner and a local oscillator, with each television signal lying in one of four frequency bands and each band including only those television signals which are separated in frequency from their adjacent channels by 6 MHz, said method comprising:

converting the local oscillator signal to a scaled local oscillator signal whose frequency is lower than the frequency of the local oscillator signal by the factor M;

establishing a periodic clock interval to provide a time base reference;

counting the number of cycles of said scaled local oscillator signal which occur during each clock interval by initiating the count from an integer P and generating an output pulse when the count exceeds another integer (Q—1), thereby generating an output pulse on the (Q—P)th cycle of said scaled local oscillator signal and on every Qth cycle thereafter during any clock interval, the factors M, P and Q being chosen so as to insure the generation of output pulses whose number is related to the channel number of the received television signal;

counting the number of said output pulses and storing the count as binary coded decimal states which are related to the number of said output pulses per clock interval and which correspond to the channel number of the received television signal;

determining in which of the four frequency bands a received television signal lies;

establishing a new value for the integer P whenever the frequency band of the received television signal changes, the numerical value of the integer P being dependent upon the frequency band within which the received television signal lies; and displaying the channel number associated with the received television signal in response to the binary coded decimal states.

19. A method as defined in claim 18, wherein the binary coded decimal states are preset to initial states which, upon completion of the counting of said output pulses, cause said binary coded decimal states to correspond to the channel number of the received television signal, said initial states being reset to different predetermined initial states whenever the frequency band of a received television signal changes.

20. A method of determining and displaying the channel number of a received television signal in a television receiver having a tuner and a local oscillator, with each television signal lying in one of four frequency bands and each band including only those television signals which are separated in frequency from their adjacent channels by 6 MHz, said method comprising:

converting the local oscillator signal to a scaled local oscillator signal whose frequency is lower than the frequency of the local oscillator signal by the factor M;

establishing a periodic clock interval to provide a time base reference;

counting the number of cycles of said scaled local oscillator signal by initiating the count from an integer P and generating an output pulse when the count exceeds another integer (Q−1), thereby generating an output pulse on the (Q−P)th cycle of said scaled local oscillator signal and on every Qth cycle thereafter during any clock interval, the factors M, P and Q being chosen so as to insure the generation of output pulses whose number is related to the channel number of the received television signal;

counting the number of said output pulses and storing the count as binary coded decimal states which are preset to initial states which, upon completion of the counting of said output pulses, cause said binary coded decimal states to correspond to the channel number of the received television signal;

determining in which of the four frequency bands a received television signal lies;

establishing a new value for the integer P and new initial states for the binary coded decimal states whenever the frequency band of the received television signal changes, the integer P and the initial states of the binary coded decimal states being dependent upon the frequency band within which the received television signal lies; and displaying the channel number associated with a received television signal in response to the binary coded decimal states.

21. A method of determining and displaying the channel number of a received television signal in a color television receiver having a 3.58 MHz color oscillator, a tuner, and a local oscillator, with each television signal lying in one of four frequency bands and each band including only those television signals which are separated in frequency from their adjacent channels by 6 MHz, said method comprising:

dividing the tuner's local oscillator signal by an integer M to produce a scaled local oscillator signal lower in frequency than the tuner's local oscillator signal by the factor M;

dividing the color oscillator signal by an integer N to produce a clock signal lower in frequency than the color oscillator signal by the factor N, the period of each clock signal being used as a clock interval to establish a time base reference;

gating the scaled local oscillator signal by the clock signal to produce a clocked local oscillator signal which contains a number of cycles of said scaled local oscillator signal for every half period of each cycle of said clock signal and none during the other half period of each clock signal cycle;

counting the number of scaled local oscillator cycles which occur during each clock interval by initiating the count from an integer P and generating an output pulse when the count exceeds another integer (Q−1), thereby generating an output pulse on the (Q−P)th cycle of the clocked local oscillator signal and on every Qth cycle thereafter during every clock interval, the integers N, M, P and Q being selected to insure that any errors in the number of cycles of the clocked local oscillator signals, attributable to the lack of a known phase relationship between said local oscillator signal and said color oscillator signal, will not be large enough to influence the number of output pulses generated, the integers M and Q being further restricted to those integers which cause an additional output pulse to be generated for each 6 Mhz increment in frequency of the received television signal;

counting the number of said output pulses and storing the count as binary coded decimal states which are related to the number of said output pulses per clock interval and which correspond to the channel number of the received television signal;

determining in which of the four frequency bands a received television signal lies;

establishing a new value for the integer P whenever the frequency band of the received television signal changes, the integer P being dependent upon the frequency band within which the television signal lies; and displaying the channel number associated with the received television signal in response to the binary coded decimal states.

22. A method as defined in claim 21, wherein the binary coded decimal states are preset to initial states which upon completion of the counting of said output pulses, causes said binary coded decimal states to correspond to the channel number of the received television signal, said initial states being reset to different predetermined initial states whenever the frequency band of a received television signal changes, said initial states being variable and dependent upon the frequency band in which a received television signal lies.

23. A method as defined in claim 21, wherein the integers M and Q are selected in accordance with the expression $M \cdot Q = 6K$, where K is the duration of the clock interval in microseconds.

24. A method of determining the channel number of any television signal in an all-electronic-continuous tuning television receiver having a tuner, a local oscillator, a counter and a clock pulse source, said television signals lying in one of four disconnected VHF and UHF frequency bands, each band including only television signals separated in frequency from adjacent television signals by 6 MHz, each band being separated by a non-integral multiple of 6 MHz, said method comprising:
converting the local oscillator signal to a scaled local oscillator signal whose frequency is lower than the frequency of the local oscillator signal;
establishing a periodic clock interval with said clock pulse source to provide a time base reference;
presetting said counter in accordance with the frequencies of said television signals to compensate for said non-integral multiple band separations; and
counting with said counter the number of cycles of said scaled local oscillator signal which occur during each clock interval and generating in response to said count output pulses related in number to the channel numbers of said television signals.

25. A method of determining the channel number of a received television signal in a television receiver having a tuner and a local oscillator, with each television signal lying in one of four frequency bands and each band including only those television signals which are separated in frequency from their adjacnt channels by 6 MHz, said method comprising:
converting the local oscillator signal to a scaled local oscillator signal whose frequency is lower than the frequency of the local oscillator signal by the factor M;
establishing a periodic clock interval to provide a time base reference;
counting the number of cycles of said scaled local oscillator signal which occur during each clock interval by initiating the count from an integer P and generating an output pulse when the count exceeds another integer (Q—1), thereby generating an output pulse on the (Q—P)th cycle of said scaled local oscillator signal and on every Qth cycle thereafter during any clock interval, the factors M, P and Q being selected to insure the generation of output pulses whose number is related to the channel number of the received television signal;
counting the number of said output pulses and storing the count as binary coded decimal states which are related to the number of said output pulses per clock interval and which correspond to the channel number of the received television signal;
determining in which of the four frequency bands a received television signal lies; and
establishing a new value for the integer P whenever the frequency band of the received television signal changes, the numerical value of the integer P being dependent upon the frequency band within which the received television signal lies.

26. A method as defined in claim 25, wherein the binary coded decimal states are preset to initial states which, upon completion of the counting of said output pulses, cause said binary coded decimal states to correspond to the channel number of the received television signal, said initial states being reset to different predetermined initial states whenever the frequency band of a received television signal changes.

27. A method as defined in claim 25, wherein the integers M and Q are selected in accordance with the expression $M \cdot Q = 6K$, where K is the duration of the clock interval in microseconds.

28. For use in an all-electronic-continuous tuning television receiver having a tuner and a local oscillator and adapted to receive television signals which may lie in any of four disconnected VHF and UHF frequency bands, each band including television signals separated in frequency from adjacent television signals by 6 MHz, each band being separated by non-integral multiples of 6 MHz, a channel number determination system comprising:
clock means for establishing a periodic clock interval which provides a time base reference for said channel number determination system;
dividing means coupled to the local oscillator for converting the local oscillator signal to a scaled local oscillator signal whose frequency is lower than the frequency of the local oscillator signal;
band recognition means for presetting said counting means in accordance with the frequencies of said television signals; and
counting means receiving said scaled local oscillator signal and responsive to said clock means for counting the number of cycles of said scaled local oscillator signal which occur during each clock interval and for generating output pulses related in number to the channel numbers of said television signals.

29. For use in a television receiver having a tuner and a local oscillator and adapted to receive television signals which may lie in any of four separated frequency bands, each band including television channels separated in frequency from their adjacent channels by 6 MHz, a channel number determination system comprising:
clock means for establishing a periodic clock interval which provides a time base reference for said channel number determination system;
dividing means coupled to the local oscillator for converting the local oscillator signal to a scaled local oscillator signal whose frequency is lower than the frequency of the local oscillator signal by a factor M; and
first counting means receiving said scaled local oscillator signal and responsive to said clock means for counting the number of cycles of said scaled local oscillator signal which occur during each clock interval, said first counting means being preset to begin counting from a preset integer P so as to produce an output pulse when the count exceeds another integer (Q—1), said first counting means generating an output pulse on the (Q—P)th cycle of said scaled local oscillator signal and on every Qth cycle thereafter during a clock interval, the factors M, P and Q being chosen to cause said first counting means to produce output pulses related in number to the channel number of the received television signal.

30. The system as defined in claim 29, further including second counting means receiving the output pulses from said first counting means and responsive to said clock means for establishing binary coded decimal states which are related to the number of said output pulses received per clock interval and which correspond to the channel number of the received television signal; and band recognition means for determining in which of the four frequency bands a received television signal lies and for resetting said first counting means to a different predetermined value of said preset integer P whenever the frequency band of the received television signal changes, the numerical value of the integer P being dependent upon the band within which the received television signal lies.

31. The system as defined in claim 30, wherein said second counting means includes a units counter and a decade counter both coupled to said band recognition means and each being preset by said band recognition means to initial counts which, when added to the number of output pulses from said first counting means during any clock interval, cause said units and decade counters to reach final counts, represented by binary coded decimal states, which correspond to the channel number of the received television signal, said initial counts being reset to different predetermined initial counts by said band recognition means upon reception of a television signal which lies within a different frequency band.

32. The system as defined in claim 31, wherein the integers M and Q are selected in accordance with the expression $M \cdot Q = 6K$, where K is the duration of the clock interval in microseconds.

* * * * *